Patented June 24, 1930

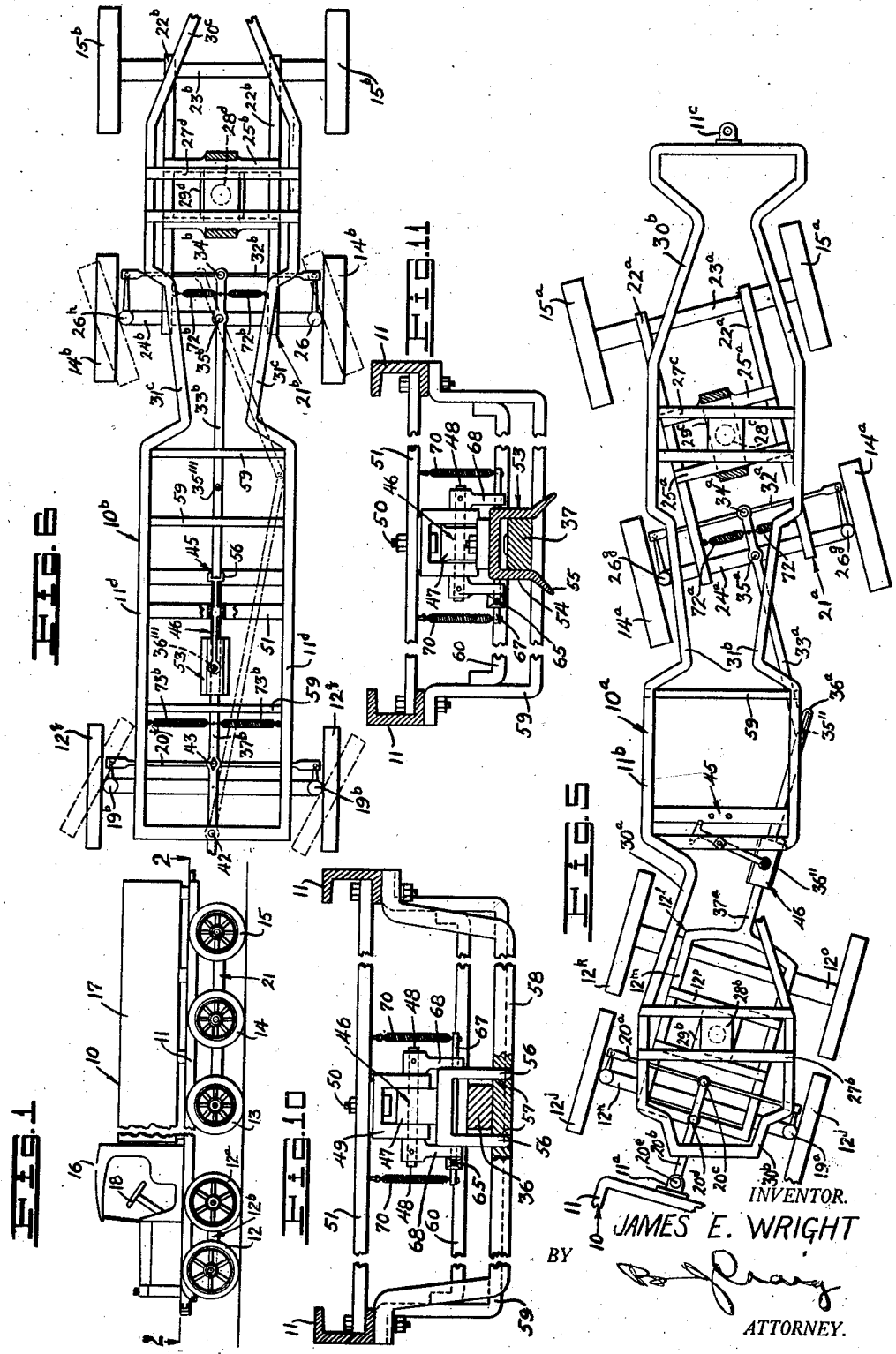

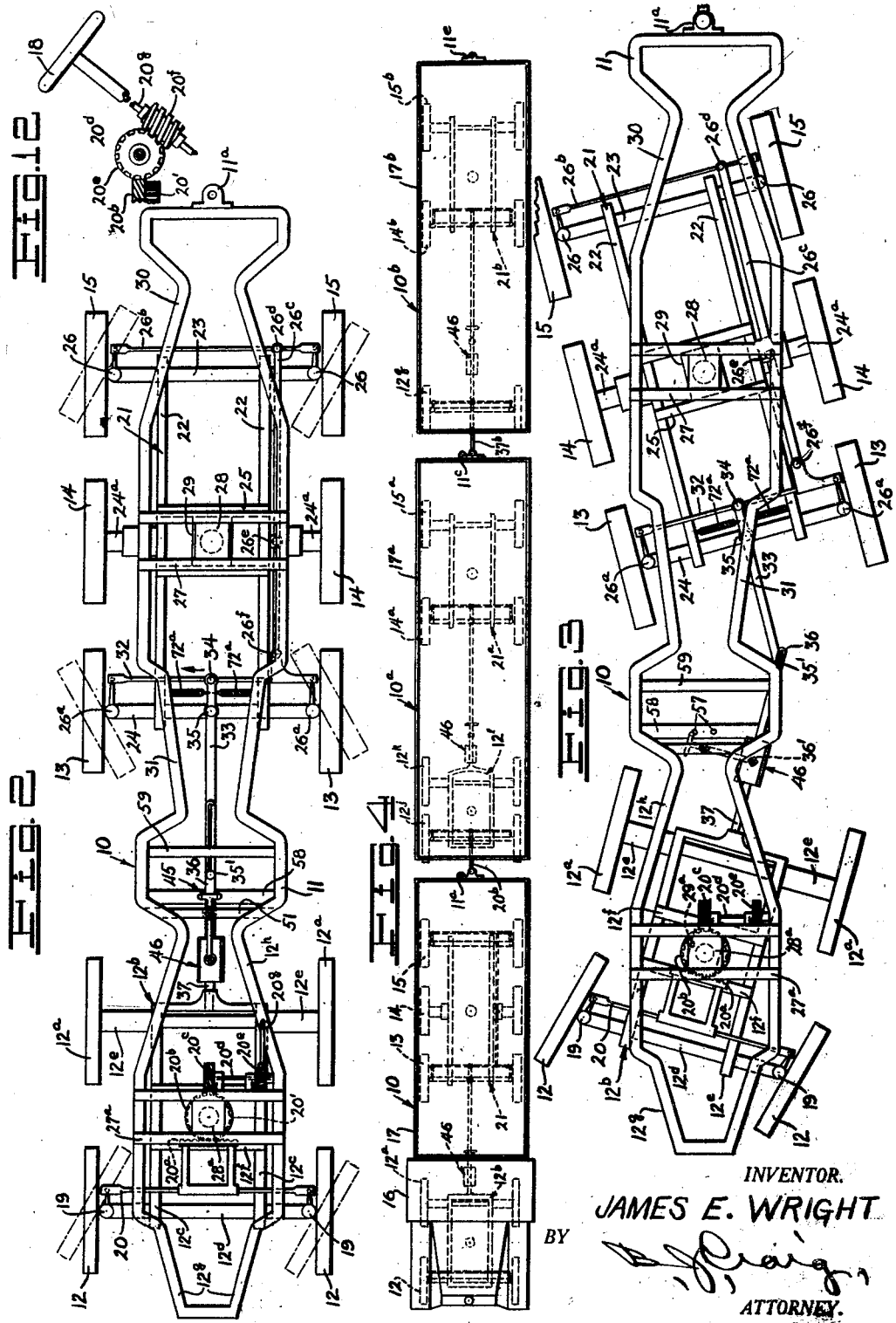

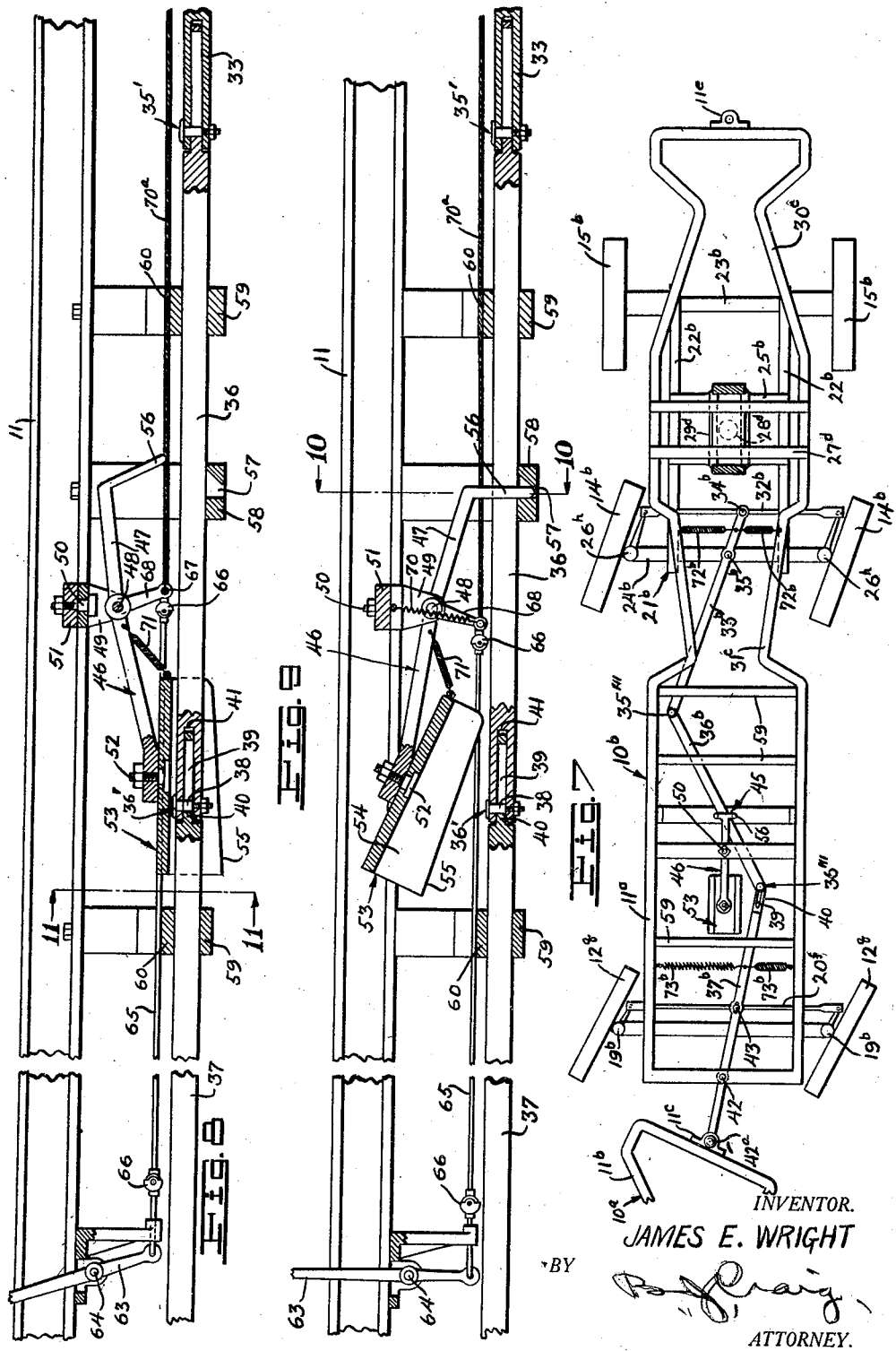

1,767,033

UNITED STATES PATENT OFFICE

JAMES E. WRIGHT, OF LOS ANGELES, CALIFORNIA

VEHICLE STEERING APPARATUS

Application filed April 16, 1927. Serial No. 184,203.

This invention relates to vehicles.

The general object of the invention is to provide an improved vehicle which may or may not be self-propelled wherein a plurality of supporting wheels are provided at each side of one end of the vehicle and wherein novel means is provided for steering said wheels.

Another object of the invention is to provide a vehicle with four or more rear wheels mounted in a novel manner so that the wheels may be turned for steering purposes.

Another object of the invention is to provide a vehicle having four or more front wheels and four or more rear wheels mounted in a novel manner so that all of the wheels may swing for steering purposes.

Another object of the invention is to provide novel means for steering the wheels of a trailing vehicle from the vehicle preceding it.

A further object of the invention is to provide an improved means for steering tandem wheels of vehicles.

A still further object of the invention is to provide a vehicle wherein the rear of the vehicle is provided with tandem wheels arranged on a truck and wherein the entire frame may swivel and wherein means is provided for turning certain of said wheels independently of the swiveling action of the truck.

Other objects and advantages of the invention will be apparent from the following description taken in connection with the accompanying drawings wherein:

Fig. 1 is a side elevation of a motor vehicle embodying the features of my invention.

Fig. 2 is a section taken on line 2—2 of Fig. 1 showing only the main chassis frame and steering mechanism.

Fig. 3 is a view similar to Fig. 2 showing the wheels in a turning position.

Fig. 4 is a top plan view of a motor truck embodying the features of my invention and a plurality of trailers, the trailers being shown as provided with my improved steering mechanism in various adaptations.

Fig. 5 is a top plan view of the chassis portion of the first trailer shown in Fig. 4.

Fig. 6 is a top plan view of the chassis portion of the second trailer shown in Fig. 4.

Fig. 7 is a view similar to Fig. 6 showing the wheels turned to move away from a side obstruction.

Fig. 8 is a fragmentary side elevation partly in section of the steering mechanism.

Fig. 9 is a view similar to Fig. 8 showing a part of the mechanism actuated to a different position.

Fig. 10 is a section taken on line 10—10 of Fig. 9.

Fig. 11 is a section taken on line 11—11 of Fig. 8 and

Fig. 12 is a side view of a portion of the truck front wheel steering mechanism.

Referring to the drawings by reference characters I have indicated a vehicle embodying the features of my invention generally at 10. This vehicle comprises a chassis including a frame 11 having two pairs of front wheels 12 and $12^a$ thereon and having three pairs of rear wheels 13, 14, and 15. The frame 11 is shown as provided at the rear end thereof with an apertured boss $11^a$ for towing purposes as will be more fully explained hereinafter.

The vehicle as shown is of the motor propelled truck type and is provided with a cab 16, a body 17 which may be of any desired character, and a steering wheel 18.

In the embodiment of my invention shown in Fig. 1, the two pairs of front wheels 12 and $12^a$ are mounted on a truck indicated generally at $12^b$, this truck $12^b$ comprises longitudinally extending side members $12^c$, transverse members or axles $12^d$ and $12^e$, and intermediate cross members $12^f$. The wheels $12^a$ are shown as mounted for rotary movement about the axis of the transverse member $12^e$ but do not shift their axis relative to the axis of the member $12^e$. The front wheels 12 of the truck $12^b$ are mounted to turn about the axis of the transverse member $12^d$ when the truck is moving in a straight line and to shift about vertical axes 19 for steering purposes.

In order that the truck $12^b$ may be turned

I provide cross members 27ᵃ on the frame 11. The cross members 27ᵃ support a downwardly extending pivot member 28ᵃ which is engaged by a cross member 29ᵃ secured to the members 12ᶠ on the truck 12ᵇ.

The frame 11 of the vehicle is bent inwardly at 12ᵍ and 12ʰ to accommodate the wheels 12 and 12ᵃ when the truck 12ᵇ is turned relative to the frame 11 as shown in Fig. 3.

The front wheels 12 are adapted to be shifted by means of a rod 20 from the steering wheel 18 through the medium of a rack 20ᵃ which engages a gear 20ᵇ. The gear 20ᵇ is coaxial with and driven by a worm wheel 20' arranged just beneath the gear 20ᵇ. The worm wheel is adapted to be turned by a worm 20ᶜ on a shaft 20ᵈ. The shaft 20ᵈ is rotated by means of another worm wheel 20ᵉ which meshes with a worm 20ᶠ on a steering wheel shaft 20ᵍ (see Fig. 12).

The coaxial gear 20ᵇ and worm wheel 20' are mounted to turn together independent of the pivot mounting of the truck 12ᵇ. It will be understood that the wheels 12 may be steered otherwise than as described if so desired.

The three pairs of rear wheels 13, 14 and 15 are mounted on a truck indicated generally at 21. This truck 21 comprises longitudinally extending side members 22, transverse members or axles 23, 24 and 24ᵃ, and intermediate cross members 25. The wheels 14 are shown as mounted for rotary movement about the axis of the transverse member 24ᵃ but do not shift their axis relative to the axis of the transverse member 24ᵃ. The wheels 13 and 15 of the truck 21 are mounted to turn about the axis of the transverse members 23 and 24 when the truck is moving in a straight line and to shift about vertical axes 26 and 26ᵃ respectively for steering purposes.

In order that the truck 21 may be turned I provide cross members 27 on the frame 11. The cross members support a downwardly extending pivoted member 28 which is engaged by a cross member 29 secured to the members 25 on the truck 21. The frame 11 of the vehicle is bent inwardly as at 30 and 31 to accommodate the wheels 13 and 15 when the truck 21 is turning relative to the frame 11 as shown in Fig. 3.

The rear wheels 15 of the truck 21 are connected by a member 26ᵇ to which a lever 26ᶜ is pivoted at 26ᵈ for steering. This lever 26ᶜ is also pivoted at 26ᵉ to the truck 21 at 26ᶠ to a rod 32 which connects the front wheels 14 of the truck 21. A lever 33 is pivoted at 34 to the rod 32 and to the transverse member 24 for steering the front wheels 13.

This lever 33 is also pivotally connected as at 35' to a lever 36 which is slackly connected as at 36' to another lever 37 (see Figs. 8 and 9). The connection 36' as shown in Figs. 8 and 9 includes a pin 38 at the end of the lever 36 which is adapted to move in a slot 39 formed in a tongue 40 on the lever 37. The tongue 40 moves in a slot 41 in the lever 36 (see Figs. 8 and 9). The lever 37 is secured to the forward truck 12ᶜ in any desired manner and is adapted to move with the truck 12ᵇ.

For causing the levers 36 and 37 to act as a unit in ordinary steering as shown in Fig. 3 and to cause the lever 36 to pivot as at 35' I provide a mechanism 46 clearly shown in Figs. 8 to 11 inclusive. This mechanism comprises a bar 47 keyed to a rod 48 which is supported on a bracket 49 which is mounted for pivotal movement about the axis of a bolt 50 which is secured to a transverse bar 51 arranged on the frame 11.

To one end of the bar 47 I secure a shoe 53 which is pivoted to turn about a bolt 52. This shoe is of U-shape and includes downwardly extending side flanges 54, the lower edges of which are flared outward as at 55 (see Fig. 11). The shoe 53 is adapted to fit over the joint at 36' so that the flanges 54 will engage the levers 36 and 37 and prevent pivoting of the levers about the connection 36'.

The other end of the bar 47 is provided with spaced downwardly extending forks 56 which are, when actuated for the purpose, adapted to straddle the lever 36 and seat themselves in apertures 57 formed in a transverse bar 58 which is secured to the frame 11 (see Figs. 9 and 10). The bar 58 also assists in supporting the lever 36 and for further supporting and positioning the lever 36 and the levers 33 and 37 I provide additional transverse members 59. These members 59 are secured to the frame 11 and have bars 60 (see Fig. 10) secured thereto and spaced from the bottom of the members 59 to provide space wherein the operating members may be arranged.

For rocking the mechanism 46 I provide a hand lever 63 located in the cab 16. This hand lever is pivoted at 64 and has a rod 65 secured to its lower end. The rod 65 includes a plurality of flexible joints, such as universal joints, 66, and is connected to a rod 67. The rod 67 is supported by a pair of arms 68 keyed to the pivot rod 48 and extending downwardly therefrom.

For normally urging the mechanism 46 to either of its two extreme positions I provide a pair of tension springs 70 preferably secured adjacent each end of the rod 67 and anchored to the bar 57. When in a position on either side of the axis of the rod 48 the springs tend to hold the rod 67 in set position. For normally centering the shoe 53 I provide a coiled spring 71 which engages one end of the shoe and the bar 47. If so desired I may provide springs 72 for normally centering the lever 33.

The construction of my improved steering device is such that when the operator desires to turn a corner the rear truck 21 will be turned to follow the arc of the front wheels. In making such a turn the mechanism 46 is set so that the shoe 53 fits over the joint 36' of the levers 36 and 37 as shown in Figs. 2, 3, 8 and 11, and then the front wheels 12 of the vehicle are turned by the rod 20 from the steering wheel 18. When the wheels 12 are turned to the position shown in dotted lines in Fig. 2 movement of the vehicle will cause the entire truck $12^b$ to turn to the position shown in Fig. 3. As the rear end of the truck $12^b$ swings to one side of the longitudinal center of the frame 11 it will cause the pivot 34 to swing in the direction of the arrow in Fig. 2 and thus turn the wheels 13 and 15 of the rear truck 21 to the position shown in dotted lines in Fig. 2. This is due to the movement of the levers 33, and levers 36 and 37 acting as a single lever. The rear wheels 15 will be shifted by the lever $26^c$ and the rod $26^b$ in an opposite direction from that of the front wheels 13 as shown in dotted lines in Fig. 2. When the wheels 13 and 15 of the rear truck are in this position movement of the vehicle will cause the rear truck 21 to follow the arc of the front wheels 12 around a turn and will cause them to gradually straighten out again as the front wheels 12 are brought back to normal.

When it is desired to move away from a side obstruction such as a curb, the wheels are straightened and the hand lever is actuated to rock the mechanism 46 to the position shown in Figs. 9 and 10. When the mechanism 46 is in this position the fork members 56 straddle the lever 36 and seat themselves in the apertures 57 of the bar 58. Now as the front wheels 12 are turned the movement of the rear end of the front truck $12^b$ will cause the lever 37 to move which will in turn move the lever 36 and as the lever 36 is pivoted at 45 by engagement with one of the tines of the forks 56 the lever 33 will be moved to cause the wheels 13 through the medium of rod 32 to turn in the same direction as the front wheels 12. In this manner it will be seen that the vehicle may readily move away from any side obstruction.

Fig. 5 is a top plan view of the chassis of the first trailer shown in Fig. 4 and indicated generally at $10^a$ and shows my improved steering mechanism as adapted to shift the wheels of the trailer $10^a$ for steering purposes. This trailer $10^a$ comprises a chassis including a frame $11^b$ having two pairs of front wheels $12^j$ and $12^k$ thereon and having two pairs of rear wheels $14^a$ and $15^a$. The frame $11^b$ is shown as adapted to support a body $17^a$ and is provided at the rear end with an apertured boss $11^c$ for towing purposes.

In the embodiment of my invention shown in Fig. 5, the two pairs of front wheels $12^j$ and $12^k$ are mounted on a truck indicated generally at $12^l$. This truck $12^l$ comprises longitudinally extending side members $12^m$, transverse members or axles $12^n$ and $12^o$, and intermediate cross members $12^p$. The wheels $12^k$ are shown as mounted for rotary movement about the axis of the tranverse member $12^o$ but do not shift their axis relative to the axis of the member $12^o$. The front wheels $12^j$ of the truck $12^l$ are mounted to turn about the axis of the transverse member $12^n$ when the truck is moving in a straight line and to shift about vertical axes $19^a$ for steering purposes.

In order that the truck $12^l$ may be turned I provide cross members $27^b$ on the frame $11^b$. The cross members $27^b$ support a downwardly extending pivot member $28^b$ which is engaged by a cross member $29^b$ secured to the members $12^p$ on the truck $12^l$. The frame $11^b$ of the trailer is bent inwardly as at $30^a$ and $30^b$ to accommodate the wheels $12^j$ and $12^k$ when the truck $12^l$ is turning relative to the frame $11^b$ as shown.

The front wheels $12^j$ of the truck $12^l$ are adapted to be shifted by means of a rod $20^a$ to which a lever $20^b$ is pivoted at $20^c$ for steering. This lever $20^b$ is also pivoted at $20^d$ to a portion of the truck $12^l$ and is pivotally connected to the boss $11^a$ of the motor truck frame 11 as at $20^e$. The lever $20^b$ is shifted by the movement of the rear end of the preceding vehicle which may be the motor truck 10.

The two pairs of rear wheels $14^a$ and $15^a$ are mounted on a truck indicated generally at $21^a$. This truck $21^a$ comprises longitudinally extending side members $22^a$, transverse members or axles $23^a$ and $24^a$, and intermediate cross members $25^a$. The wheels $15^a$ are shown as mounted for rotary movement about the axis of the transverse member $23^a$ but do not shift their axis relative to the axis of the member $23^a$. The front wheels $14^a$ of the truck $21^a$ are mounted to turn about the axis of the transverse member $24^a$ when the truck is moving in a straight line and to shift about vertical axes $26^g$ for steering purposes.

In order that the truck $21^a$ may be turned I provide cross members $27^c$ on the frame $11^b$. The cross members $27^c$ support a downwardly extending pivoted member $28^c$ which is engaged by a cross member $29^c$ secured to the members $25^a$ on the truck $21^a$. The frame $11^b$ of the vehicle may be bent inwardly as at $30^b$ and $31^b$ to accommodate the wheels $14^a$ and $15^a$ when the truck $21^a$ is turning relative to the frame $11^b$ as shown.

The front wheels $14^a$ of the truck $21^a$ are connected by a member $32^a$ to which a lever $33^a$ is pivoted at $34^a$ for steering. This lever $33^a$ is also pivoted at $35^a$ to the transverse member or axle $24^a$. The lever $33^a$ is also pivotally connected as at $35''$ to a lever $36^a$ which is slackly connected as at $36''$ to another lever $37^a$. The connections $35''$ and $36''$ are similar to the previously described connections $35'$ and $36'$ shown in Figs. 8 and 9. The lever $37^a$ is shown as integral with the rear end of the forward truck $12^l$ and is adapted to move therewith.

For causing the levers $36^a$ and $37^a$ to act as a unit in ordinary steering as shown in Fig. 5 and to cause the lever $36^a$ to pivot at 45 I may provide the mechanism 46 which has been previously described and is clearly shown in Figs. 8 to 11 inclusive.

For rocking the mechanism 46 of the trailer from the hand lever 63 located in the cab 16 of the motor truck 10 I provide a flexible connection $70^a$ from one of the arms 68 of the motor truck mechanism 46 to the mechanism 46 of the trailer. If so desired I may provide springs $72^a$ for normally centering the lever $33^a$.

The operation of my improved steering mechanism is the same on the trailer $10^a$ as previously described in connection with the motor vehicle 10. The construction of my improved steering device on the trailer $10^a$ is such that when the rear end of the motor vehicle 10 shifts in turning a corner it will move the lever $20^b$ and cause the rod $20^a$ to move. In making such a turn the mechanism 46 is set so that the shoe 53 fits over the joint $36''$ of the levers $36^a$ and $37^a$. As the rod $20^a$ is moved it will cause the levers $33^a$, $36^a$ and $37^a$ to assume the position shown and these levers will cause the wheels $14^a$ of the truck $21^a$ to turn in an opposite direction from that of the front wheels 12. When the wheels are in this position the rear truck $21^a$ will follow the arc of the front wheels around the turn and gradually straighten out again as the front wheels $12^j$ are brought back to normal.

When it is desired to move away from a side obstruction such as a curb, the wheels are straightened and the hand lever is actuated through the connection $70^a$ to rock the mechanism 46 to the position shown in Figs. 9 and 10. When the mechanism 46 is in this position the fork members 56 straddle the lever $36^a$ and seat themselves in the apertures 57 of the bar 58. Now as the front wheels $12^j$ are turned by the rod $2^a$ the lever $27^a$ will move which will in turn move the lever $36^a$ and as the lever $36^a$ is pivoted at 45 by engagement with one of the tines of the forks 56 the lever $33^a$ will be moved to cause the wheels $12^a$ through the medium of rod $32^a$ to turn in the same direction as the front wheels $12^j$. In this manner it will be seen that the front vehicle 10 and its trailer $10^a$ may readily move away from any side obstruction.

In Figs. 6 and 7 I have shown my improved steering mechanism as applied to the second trailer indicated generally at $10^b$ in Fig. 4. This trailer $10^b$ comprises a chassis including a frame $11^d$ having a pair of front wheels $12^q$ thereon and having two pairs of rear wheels $14^b$ and $15^b$. The front $11^d$ is shown as adapted to support a body $17^b$ and is provided at the rear end with an apertured boss $11^e$ for towing purposes.

In the embodiment of my invention shown in Figs. 6 and 7 the front wheels $12^q$ are mounted to turn about vertical axes $19^b$. These front wheels are adapted to be shifted by means of a rod $20^f$ which is in turn adapted to be shifted by a lever $37^b$ pivotally connected thereto as at 43. The lever $37^b$ is shown as pivotally secured to a portion of the frame $11^d$ at 42 and pivotally connected to the boss $11^e$ of the trailer $10^a$ as at $42^a$. As the rear end of the trailer $10^a$ moves in turning it will move the lever $37^b$ and through the medium of rod $20^f$ will shift the wheels $12^q$ about the axes $19^b$ for steering.

The two pairs of rear wheels $14^b$ and $15^b$ are mounted on a truck indicated generally at $21^b$. This truck $21^b$ comprises longitudinally extending side members $22^b$, transverse members or axles $23^b$ and $24^b$, and intermediate cross members $25^b$.

The wheels $15^b$ are shown as mounted for rotary movement about the axis of the transverse member $23^b$ but do not shift their axis relative to the axis of the member $23^b$. The front wheels $14^b$ of the truck $21^b$ are mounted to turn about the axis of the transverse member $24^b$ when the truck is moving in a straight line and to shift about vertical axes $26^d$ for steering purposes.

In order that the truck $21^b$ may be turned I provide cross members $27^d$ on the frame $11^d$. The cross members support a downwardly extending pivoted member $28^d$ which is engaged by a cross member $29^d$ secured to the members $25^b$ on the truck $21^b$. The frame $11^d$ of the vehicle is bent inwardly as at $30^e$ and $31^e$ to accommodate the wheels $14^b$ and $15^b$ when the truck $21^b$ is turning relative to the frame $11^d$.

The front wheels $14^b$ of the truck 21 are connected by a member $32^b$ to which a lever $33^b$ is pivoted at $34^b$ for steering. This lever $33^b$ is also pivoted at $35^b$ to the transverse member or axle $24^b$. The lever $33^b$ is also pivotally connected as at $35'''$ to a lever $36^b$ which is slackly connected as at $36'''$ to the lever 37. The connections $35'''$ and $36'''$ are similar to the connections $35'$ and $36'$ which have been previously described and are shown in Figs. 8 and 9. The lever $37^b$ is pivotally secured to the frame $11^d$ at 42 and is pivotally connected at 43 to the rod 20ᶠ which connects the front wheels 12ᵠ of the wheels as previously described.

For causing the levers 36ᵇ and 37ᵇ to act as a unit in ordinary steering as shown in Fig. 6 and to cause the lever 36ᵇ to pivot as at 45 in Fig. 7, I provide the mechanism 46 as previously described and clearly shown in Figs. 8 to 11 inclusive.

For rocking the mechanism 46 of the trailer 10ᵇ I provide a flexible connection 71 which may extend from one of the arms 68 of the mechanism 46 on the trailer 10ᵃ and as the mechanism 46 on the trailer 10ᵃ is connected to the mechanism 46 on the truck 10 it will be seen that upon the actuation of the mechanism 46 of the truck 10 the mechanisms 46 on the trailers 10ᵃ and 10ᵇ will also be actuated. If so desired I may provide springs 72ᵇ for normally centering the lever 33ᵇ, and other springs 73ᵇ for centering the lever 37ᵇ.

The construction of my improved steering device on the trailer 10ᵇ is such that when the rear end of the trailer 10ᵃ shifts in turning a corner it will move the lever 37ᵇ and cause the rod 20ᶠ to move. In making such a turn the mechanism 46 is set so that the shoe 53 fits over the joint 36‴ of the levers 33ᵇ, 36ᵇ and 37ᵇ as shown in Fig. 6. As the rod 20ᶠ is moved it will cause the levers 33ᵇ, 36ᵇ and 37ᵇ to assume the position shown in dotted lines in Fig. 6 and these levers will cause the wheels 14ᵇ of the truck 21ᵇ to turn in an opposite direction from that of the front wheels 12ᵠ. When the wheels are in this position the rear truck 21ᵇ will follow the arc of the front wheels around the turn and gradually straighten out again as the front wheels 12ᵠ are brought back to normal.

When it is desired to move away from a side obstruction such as a curb, the wheels are straightened and the hand lever is actuated to rock the mechanism 46 to the position shown in Figs. 7, 9 and 10. When the mechanism 46 is in this position the fork members 56 straddle the lever 36ᵇ and seat themselves in the apertures 57 of the bar 58. Now as the front wheels 12ᵃ are turned by the lever 37ᵇ the lever 37ᵇ will in turn move the lever 36ᵇ and as the lever 36ᵇ is pivoted at 45 by engagement with one of the tines of the forks 56 the lever 33ᵇ will be moved to cause the wheels 14ᵇ through the medium of rod 32ᵇ to turn in the same direction as the front wheels 12ᵠ (see Fig. 7). In this manner it will be seen that the vehicle may readily move away from any side obstruction.

Although I have shown and described my invention as being applied to a motor vehicle of the truck type, I wish it to be understood that the invention may be applied to trailers, busses, and various other forms of vehicles.

From the foregoing description it will be apparent that I have provided a novel means for automatically steering the various wheels of a vehicle and wherein means is provided for altering the angular relation of some of the wheels in respect to the others when the vehicle is making a turn.

Having thus described my invention, I claim:

1. In a vehicle, a frame having front wheels thereon, a truck supporting the rear end of said frame, wheels on said truck, said last mentioned wheels being swivelly connected to said truck, means associated with said frame and said truck for turning said front wheels and other means associated with said first mentioned means and said frame and selective to turn the front wheels of said truck in either of two directions when said first mentioned front wheels are turned in a single direction.

2. In a vehicle, a frame, front and rear pairs of wheels swivelly connected to said frame, means for automatically turning one pair of wheels from another pair of wheels, said means including a plurality of levers pivotally connected together and means connecting said levers and wheels whereby when one pair of wheels is turned the other pair of wheels will be turned in an opposite direction, and means associated with said pivoted levers whereby two of said pivotally connected levers are adapted to act as a single lever to cause said pairs of wheels to turn in opposite directions.

3. In a vehicle, a frame having supporting wheels on one end thereof, means to steer said wheels, a truck supporting the other end of said frame, said truck being swivelly connected to said frame, wheels mounted on said truck, certain of said wheels being mounted to swivel relative to said truck, means associated with said frame and said truck for turning said swiveling wheels of said truck in an opposite direction when said wheels of said frame are turned in one direction, and means associated with said frame and said last mentioned means causing said last mentioned means to turn the swiveling wheels of said truck in the same direction as the wheels of said frame when said wheels of the frame are turned.

4. In a vehicle, a frame having front wheels and rear wheels swivelly mounted thereon, a cross member connecting the rear wheels, a pivoted lever, said lever engaging said cross member, a second lever pivoted to said first mentioned lever, a second cross member connecting said front pair of wheels, a third lever, said third lever being pivoted to said frame, said third lever pivotally engaging said second cross member, means to shift said second cross member to steer said vehicle and means to render rigid the joint between said second and third levers, said last mentioned means including a U-shaped member and means to move said U-shaped member over said last mentioned joint.

5. In a vehicle, a frame, a front pair and a rear pair of wheels swivelly connected to said frame, means connecting said pairs of wheels for automatically turning one pair of wheels from the other pair of wheels, other means associated with said automatic turning means and said frame adapted to control said automatic turning means, said other means including mechanism to selectively turn said front and rear pairs of wheels in the same direction relative to said frame or in opposite directions relative to said frame.

6. A vehicle including a frame, wheels supporting the front end of said frame, means to steer said wheels, a truck supporting the other end of said frame, spaced pairs of wheels mounted on said truck, one pair of said truck wheels being mounted to swivel relatively to said truck, steering means for said swivel wheels, and selectively operable means associated with both said steering means for turning said front wheels and said swivelling wheels in the same direction or in opposite directions relative to each other.

7. In a vehicle, a frame, a front pair of wheels swivelled to said frame, a rear pair of wheels swivelled to said frame, means for turning said front pair of wheels, means for turning said rear pair of wheels, a third means connected to both said turning means whereby said second named turning means may be operated from said first named turning means, a fourth means for rigidifying the connection between said first named turning means and said third means, whereby operation of said first named turning means will cause said second named turning means to move in one direction relatively to the frame and means for rendering said fourth named means inoperative whereby operation of said first named turning means will cause said second named turning means to move in a second direction relatively to the frame.

In witness whereof, I hereunto affix my signature.

JAMES E. WRIGHT.